(12) United States Patent
Gu et al.

(10) Patent No.: US 11,972,326 B2
(45) Date of Patent: Apr. 30, 2024

(54) PARITY CHECKING METHOD FOR QUBIT AND SUPERCONDUCTING QUANTUM CHIP

(71) Applicant: Tencent Technology (Shenzhen) Company Limited, Guangdong (CN)

(72) Inventors: Xiu Gu, Guangdong (CN); Sainan Huai, Guangdong (CN); Shuoming An, Guangdong (CN); Zhenxing Zhang, Guangdong (CN); Yu Zhou, Guangdong (CN); Xiong Xu, Guangdong (CN); Shengyu Zhang, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 18/050,281

(22) Filed: Oct. 27, 2022

(65) Prior Publication Data

US 2023/0107161 A1  Apr. 6, 2023

Related U.S. Application Data

(63) Continuation of application No. PCT/CN2021/124348, filed on Oct. 18, 2021.

(30) Foreign Application Priority Data

May 26, 2021  (CN) .......................... 202110580249.4

(51) Int. Cl.
*G06N 10/70* (2022.01)
*G06F 11/10* (2006.01)
(Continued)

(52) U.S. Cl.
CPC ............. *G06N 10/70* (2022.01); *G06F 11/10* (2013.01); *G06F 11/1004* (2013.01);
(Continued)

(58) Field of Classification Search
CPC ........ G06N 10/70; G06N 10/00; G06N 10/20; G06N 10/40; G06F 11/10; G06F 11/1004
(Continued)

(56) References Cited

U.S. PATENT DOCUMENTS 7,781,754 B2 * 8/2010 Loss ...................... B82Y 10/00
  257/E21.089
10,352,992 B1 * 7/2019 Zeng ...................... G06N 10/00
(Continued)

FOREIGN PATENT DOCUMENTS

CN   110738321 A   1/2020
CN   111222644 A   6/2020
(Continued)

OTHER PUBLICATIONS

International Search Report and Written Opinion dated Feb. 28, 2022 for International Application No. PCT/CN2021/124348.
(Continued)

*Primary Examiner* — John J Tabone, Jr.
(74) *Attorney, Agent, or Firm* — Crowell & Moring LLP (57) ABSTRACT

A parity checking method and apparatus for a qubit, a superconducting quantum chip, an electronic device, and a storage medium are provided. The method includes: configuring a measurement system for a qubit excited state measurement environment, the measurement system including: a first data qubit, a second data qubit, and an auxiliary qubit; determining a first operational frequency parameter of the first data qubit; determining a second operational frequency parameter of the second data qubit; determining a third operational frequency parameter of the auxiliary qubit; determining a logic gate matching the qubit excited state measurement environment based on the first operational frequency parameter, the second operational frequency parameter, and the third operational frequency parameter;
(Continued)

and checking parity of a qubit in the qubit excited state measurement environment according to the logic gate.

20 Claims, 5 Drawing Sheets

(51) Int. Cl.
    *G06N 10/00*     (2022.01)
    *G06N 10/20*     (2022.01)
    *G06N 10/40*     (2022.01)

(52) U.S. Cl.
    CPC ............ *G06N 10/00* (2019.01); *G06N 10/20* (2022.01); *G06N 10/40* (2022.01)

(58) Field of Classification Search
    USPC ........................................................ 714/734
    See application file for complete search history.

(56) References Cited

U.S. PATENT DOCUMENTS

| | | | |
|---|---|---|---|
| 10,852,346 B1* | 12/2020 | Zeng | G06N 10/00 |
| 11,573,259 B1* | 2/2023 | Zeng | G01R 31/2851 |
| 2008/0142787 A1* | 6/2008 | Loss | B82Y 10/00 |
| | | | 257/E29.071 |
| 2018/0330264 A1* | 11/2018 | Lanting | G06N 10/00 |
| 2019/0266508 A1* | 8/2019 | Bunyk | G06F 11/0751 |
| 2020/0311594 A1* | 10/2020 | Gidney | G11C 11/4063 |
| 2023/0107161 A1* | 4/2023 | Gu | G06F 11/10 |
| | | | 714/738 |

FOREIGN PATENT DOCUMENTS

| | | |
|---|---|---|
| CN | 111626427 A | 9/2020 |
| CN | 111967603 A | 11/2020 |
| WO | WO 2020/188240 A1 | 9/2020 |

OTHER PUBLICATIONS

Office Action and Searh Report of European application EP21938140.7 dated Nov. 24, 2023, 9 pages.

Kwon, Sangil et al., "Gate-based superconducting quantum computing", Tutorial dated Feb. 2, 2021, supported by CREST, JST and the New Energy and Industrial Technology Development Organization.

* cited by examiner

PARITY CHECKING METHOD FOR QUBIT AND SUPERCONDUCTING QUANTUM CHIP

RELATED APPLICATION

This application is a bypass continuation application of International PCT Patent Application No. PCT/CN2021/124348 filed on Oct. 18, 2021 which claims priority to Chinese Patent Application No. 202110580249.4 filed on May 26, 2021. These patent applications are incorporated herein by reference in their entireties.

FIELD OF THE TECHNOLOGY

This application relates to the field of signal processing technologies, and in particular, to a parity checking method and apparatus for a qubit, a superconducting quantum chip, an electronic device, and a storage medium.

BACKGROUND OF THE DISCLOSURE

A quantum bit (qubit) on a superconducting chip is a carrier of a quantum state, and carries quantum information. Superconducting quantum computing has the advantage of a fast operating speed, thereby being widely used. The quantum computing is decomposed into single-bit logic gate computing and two-bit logic gate computing, where a two-bit logic gate includes a quantum state exchange operation, a controlled NOT (CNOT) gate operation, a controlled phase (CP) gate operation, and the like. During use of the superconducting quantum chip, when performing large-scale quantum computing, quantum error correction usually encodes information through entangled states of a plurality of qubits, and the entangled states of the plurality of qubits are also eigenstates of parity check operators. When there is an error, the quantum state leaves an encoding space thereof and thus may be detected. Therefore, qubit parity check is crucial for error symptom identification in a process of quantum error correction. Because the parity check is necessarily repeated within a decoherence time of the qubits, and a state in subspace of the parity check needs to remain unchanged to avoid introducing additional errors, how to perform accurate parity check in a short time, and keep the parity subspace intact is very important for the use of the superconducting quantum chip.

SUMMARY

In view of this, embodiments of this disclosure provide a parity checking method and apparatus for a qubit, a superconducting quantum chip, an electronic device, and a storage medium. The technical solutions in the embodiments of this disclosure are implemented as follows:

An embodiment of this disclosure provides a parity checking method for a qubit,
including:
configuring a measurement system for a qubit excited state measurement environment, the measurement system including: a first data qubit, a second data qubit, and an auxiliary qubit;
determining a first operational frequency parameter of the first data qubit;
determining a second operational frequency parameter of the second data qubit;
determining a third operational frequency parameter of the auxiliary qubit;
determining a logic gate matching the qubit excited state measurement environment based on the first operational frequency parameter, the second operational frequency parameter, and the third operational frequency parameter; and
checking parity of a qubit in the qubit excited state measurement environment according to the logic gate.

An embodiment of this disclosure further provides a parity checking apparatus for a qubit, including:
a signal transmission module, configured to configure a measurement system for a qubit excited state measurement environment, the measurement system including: a first data qubit, a second data qubit, and an auxiliary qubit; and
a signal processing module, configured to:
determine a first operational frequency parameter of the first data qubit;
determine a second operational frequency parameter of the second data qubit;
determine a third operational frequency parameter of the auxiliary qubit;
determine a logic gate matching the qubit excited state measurement environment based on the first operational frequency parameter, the second operational frequency parameter, and the third operational frequency parameter; and
check parity of a qubit in the qubit excited state measurement environment according to the logic gate.

An embodiment of this disclosure further provides a superconducting quantum chip, including:
a memory, configured to store executable instructions; and
a processor, configured to implement, when running the executable instructions stored in the memory, the parity checking method for a qubit provided in the embodiments of this disclosure.

An embodiment of this disclosure further provides an electronic device, including:
a memory, configured to store executable instructions; and
a processor, configured to implement, when running the executable instructions stored in the memory, the parity checking method for a qubit provided in the embodiments of this disclosure.

An embodiment of this disclosure further provides a non-transitory computer-readable storage medium, storing executable instructions, the executable instructions, when executed by a processor, implementing the parity checking method for a qubit provided in the embodiments of this disclosure.

DESCRIPTION OF EMBODIMENTS

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, related "some embodiments" describe a subset of all possible embodiments. However, it may be understood that the "some embodiments" may be the same subset or different subsets of all the possible embodiments, and may be combined with each other without conflict. In the following description, the involved term "plurality of" means at least two.

Before the embodiments of this disclosure are further described in detail, various terms used in the embodiments of this disclosure are described. The terms provided in the embodiments of this disclosure are subject to the following explanations.

1) "Based on": it is used for representing a condition or status on which one or more operations to be performed depend. When the condition or status is satisfied, the one or more operations may be performed immediately or after a set delay. Unless explicitly stated, there is no limitation on the order in which the plurality of operations are performed.

2) Superconducting qubit: it is a superconducting quantum circuit formed by using Josephson junctions.

3) Superconducting quantum chip: it is a central processing unit of a superconducting quantum computer. The superconducting quantum computer is a machine that performs calculations through a principle of quantum mechanics. Based on the superposition principle of quantum mechanics and quantum entanglement, the quantum computer has relatively strong parallel processing capabilities and can resolve some problems that are difficult for a classical computer to calculate. The zero resistance characteristic of superconducting qubits and a manufacturing process close to that of integrated circuits make a quantum computing system constructed by using superconducting qubits one of the most promising systems currently for implementing practical quantum computing.

4) Parity check: it is to detect that a quantity of qubits in an excited state ⊢|1⟩ is an odd number or an even number.

5) Parity check operator: it is also referred to as a stabilizer generator. Occurrence of quantum noise (an error) changes eigenvalues of some stabilizer generators, so that quantum error correction can be performed according to the information.

6) Error syndrome: when there is no error, eigenvalues of stabilizer generators are 0; and when quantum noise occurs, eigenvalues of stabilizer generators (parity check operators) of some error correction codes change into 1. Bit strings formed by these syndrome bits 0 and 1 are referred to as error syndromes.

7) Parity check circuit: it is also referred to as a syndrome measurement circuit, and is a quantum circuit for obtaining an error syndrome. Generally, the circuit is contaminated with noise.

Figure 1:
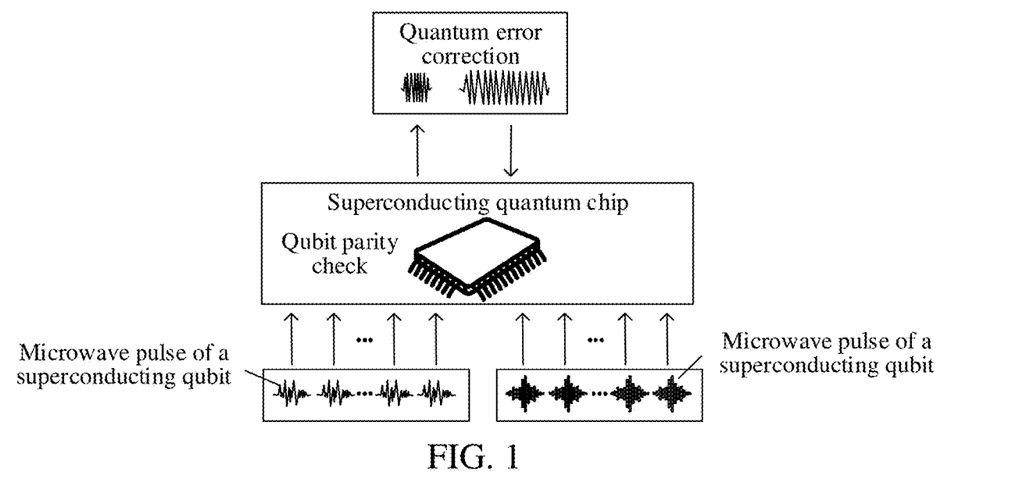
FIG. 1 is a schematic diagram of a use scenario of a parity checking method for a qubit according to an example embodiment of this disclosure.

The following describes a parity checking method for a qubit provided in the embodiments of this disclosure. FIG. 1 is a schematic diagram of a use scenario of a parity checking method for a qubit according to an embodiment of this disclosure. Referring to FIG. 1, a superconducting quantum computer is a device that uses quantum logic for computing. Compared with the conventional computer, the computational efficiency of the superconducting quantum computer when solving some specific problems can be greatly improved, so the superconducting quantum computer has attracted widespread attention. A superconducting quantum chip can achieve large-scale integration by using related semiconductor process technologies. At the same time, superconducting qubits show superior performance than other physical systems in an aspect of key indicators required for quantum computing such as interaction control, selective operation, and error correction. Therefore, the superconducting quantum chip is one of the most promising platforms for realizing the superconducting quantum computer. A superconducting quantum computer mainly includes a superconducting quantum chip and a hardware system for chip control and measurement. The hardware system mainly includes signal generators of various microwave frequency bands and devices of various microwave frequency bands, including, but not limited to a filter, an amplifier, an isolator, and the like. The hardware system also includes a dilution refrigerator equipped with a microwave transmission line. During use of the superconducting quantum chip, when performing large-scale quantum computing, quantum error correction usually encodes information through entangled states of a plurality of qubits, and quantum error correction are also eigenstates of parity check operators. When there is an error, the quantum state leaves an encoding space thereof. Therefore, qubit parity check is crucial for error symptom identification in a process of quantum error correction. Because the parity check is necessarily repeated within a decoherence time of the qubits, and a state in subspace of the parity check needs to remain unchanged to avoid introducing additional errors, how to perform accurate parity check in a short time, and keep the parity subspace intact is very important for the use of the superconducting quantum chip.

Figure 2:
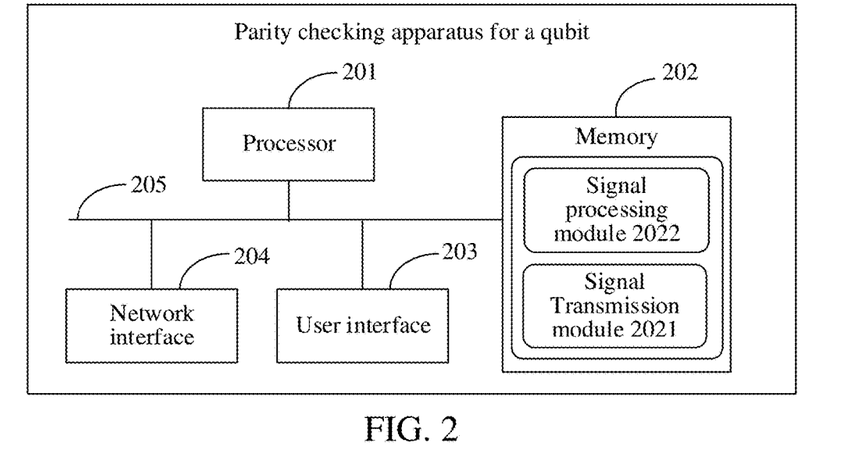
FIG. 2 is a schematic diagram of a composition structure of a parity checking apparatus for a qubit according to an example embodiment of this disclosure.

The following exemplarily describes a structure of a parity checking apparatus for a qubit provided in the embodiments of this disclosure. The parity checking apparatus for a qubit may be implemented in various forms, for example, a superconducting quantum chip with a processing function of the parity checking apparatus for a qubit, or an integrated chip provided with the processing function of the parity checking apparatus for a qubit, such as, the superconducting quantum chip in FIG. 1. FIG. 2 is a schematic diagram of a composition structure of a parity checking apparatus for a qubit according to an embodiment of this disclosure. It may be understood that, FIG. 2 shows only an exemplary structure of the parity checking apparatus for a qubit. The structure shown in FIG. 2 may be partially or entirely implemented based on applications.

The parity checking apparatus for a qubit provided in this embodiment of this disclosure includes: at least one processor 201, a memory 202, a user interface 203, and at least one network interface 204. The components in the parity checking apparatus for a qubit are coupled by using a bus system 205. It may be understood that the bus system 205 is configured to implement connection and communication between the components. In addition to a data bus, the bus system 205 further includes a power bus, a control bus, and a state signal bus. However, for ease of clear description, all types of buses are shown as the bus system 205 in FIG. 2.

The user interface 203 may include a display, a keyboard, a mouse, a trackball, a click wheel, a key, a button, a touchpad, or a touch screen.

It may be understood that, the memory 202 may be a volatile memory or a non-volatile memory, or may include both a volatile memory and a non-volatile memory. The memory 202 in this embodiment of this disclosure can store data to support operations in a superconducting quantum chip of an electronic device. Examples of these types of data include any computer program to be operated on the superconducting quantum chip of the electronic device, for example, an operating system and an application program. The operating system includes various system programs, such as framework layers, kernel library layers, and driver layers used for implementing various basic business and processing hardware-based tasks. The application program may include various application programs. The electronic device provided in this embodiment of this disclosure may be implemented as a terminal device of any type, or may be implemented as a server.

In some embodiments, the parity checking apparatus for a qubit provided in this embodiment of this disclosure may be implemented by a combination of software and hardware. As an example, the parity checking apparatus for a qubit provided in this embodiment of this disclosure may be a processor in the form of a hardware decoding processor, and is programmed to perform the parity checking method for a qubit provided in the embodiments of this disclosure. For example, the processor in the form of the hardware decoding processor may use one or more application-specific integrated circuits (ASIC), a digital signal processor (DSP), a programmable logic device (PLD), a complex PLD (CPLD), a field programmable gate array (FPGA), or another electronic element.

As an example in which the parity checking apparatus for a qubit provided in this embodiment of this disclosure is implemented by the combination of software and hardware, the parity checking apparatus for a qubit provided in this embodiment of this disclosure may be directly embodied as a combination of software modules executed by the processor 201. The software modules may be located in a storage medium, and the storage medium is located in the memory 202. The processor 201 reads executable instructions included in the software modules in the memory 202 and uses necessary hardware (for example, including the processor 201 and other components connected to the bus 205) in combination, to complete the parity checking method for a qubit provided in the embodiments of this disclosure.

As an example, the processor 201 may be a superconducting electronic chip having a signal processing capability, such as, a general-purpose processor, a DSP, or another programmable logic device, a discrete or transistor logic device, or a discrete hardware component, where the general-purpose processor may be a microprocessor, any conventional processor, or the like.

As an example in which the parity checking apparatus for a qubit provided in this embodiment of this disclosure is implemented by hardware, the apparatus provided in this embodiment of this disclosure may directly use the processor 201 in the form of the hardware decoding processor, for example, may perform and implement the parity checking method for a qubit provided in embodiments of this disclosure when being executed by the one or more ASICs, the DSP, the PLD, the CPLD, the FPGA, or the another electronic element.

The memory 202 in this embodiment of this disclosure is configured to store various types of data to support operations of the parity checking apparatus for a qubit. Examples of these types of data include any executable instruction to be operated on the parity checking apparatus for a qubit, for example, an executable instruction. A program for implementing the parity checking method for a qubit of the embodiments of this disclosure may be included in the executable instruction.

In some embodiments, the parity checking apparatus for a qubit provided in the embodiments of this disclosure may be implemented in the form of software. FIG. 2 shows a parity checking apparatus for a qubit stored in the memory 202, which may be software in the form of a program, a plug-in, or the like, and include a series of modules. An example of the program stored in the memory 202 may include the parity checking apparatus for a qubit. The parity checking apparatus for a qubit includes the following software modules: a signal transmission module 2021 and a signal processing module 2022. When the software modules in the parity checking apparatus for a qubit is read by the processor 201 into a random access memory (RAM) and is executed, the parity checking method for a qubit provided in the embodiments of this disclosure is implemented, where functions of the software modules in the parity checking apparatus for a qubit include: the signal transmission module 2021, configured to configure a measurement system for a qubit excited state measurement environment, the measurement system including: a first data qubit, a second data qubit, and an auxiliary qubit; and the signal processing module 2022, configured to: determine a first operational frequency parameter of the first data qubit; determine a second operational frequency parameter of the second data qubit; determine a third operational frequency parameter of the auxiliary qubit; determine a logic gate matching the qubit excited state measurement environment based on the first operational frequency parameter, the second operational frequency parameter, and the third operational frequency parameter; and check parity of a qubit in the qubit excited state measurement environment according to the logic gate. The term operational frequency may be alternatively referred to as working frequency, working point frequency, or operational point frequency.

Figure 3:
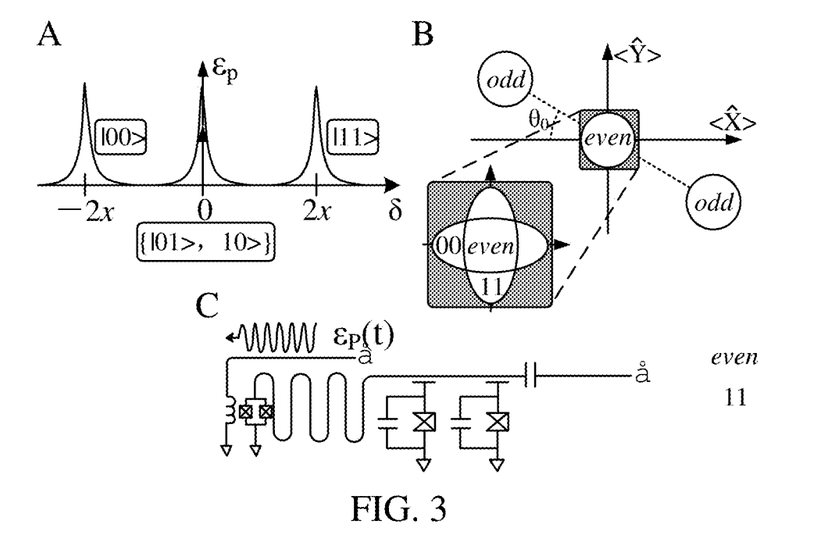
FIG. 3 is a schematic diagram of a process of directly performing parity check by using a cavity.

Before describing the parity checking method for a qubit provided in this disclosure, a parity checking manner for a qubit in the related art is first described. FIG. 3 is a schematic diagram of a process of directly performing parity check by using a cavity. As shown in FIG. 3, a key of directly performing parity check is to map parity information of a plurality of data qubits onto a read cavity that is directly coupled to the data qubits and can be directly measured. By using dispersion interaction of cavity quantum electrodynamics, joint parity check of bits can be performed by observing frequency movement information of the read cavity. In this solution, one read cavity needs to be simultaneously coupled to a plurality of bits, and a high-efficiency single-photon detector and a high-amplification parametric amplifier may be used, or a parametrically driven nonlinear resonant cavity may be directly used for read operation. The disadvantages of this manner are that, (1) it has high requirements for the single-photon detector and the parametric amplifier; (2) one read cavity usually needs to be simultaneously coupled to a plurality of qubits, or nonlinearity needs to be introduced into the read cavity for parametric amplification, which may be incompatible with solutions of currently commonly used quantum processors, and needs to introduce additional devices or designs; (3) to reduce coupling between two bits mediated by a resonant cavity, a large detuning is required between the bits, and there is an inevitable frequency crowding problem when there are more bits; and (4) because the dissipation of the resonant cavity is usually large, the manner of directly performing parity check is not easily expanded, and the circuit depth is low.

Figure 4:
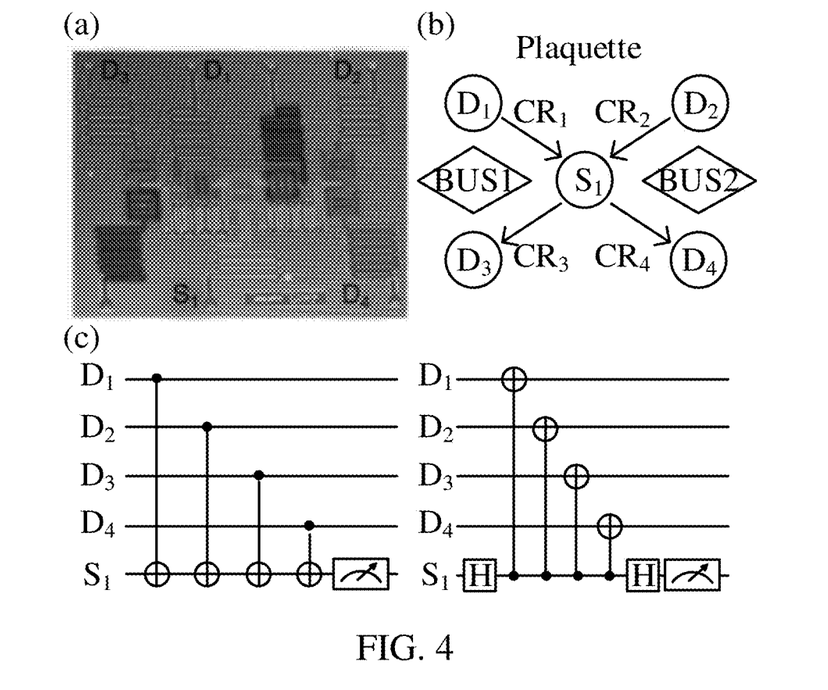
FIG. 4 is an example schematic diagram of a process of indirectly performing parity check by using an auxiliary qubit to perform a discrete two-bit gate operation.

FIG. 4 is a schematic diagram of a process of indirectly performing parity check by using an auxiliary qubit to perform a discrete two-bit gate operation. As shown in FIG. 4, an indirect parity checking system includes a plurality of data qubits and an auxiliary qubit, a two-bit controlled NOT (CNOT) gate operation is usually performed between the auxiliary qubit and each of the data qubits respectively, and finally joint parity check information of the data qubits is obtained through a measurement result of the auxiliary qubit. The disadvantages of this manner are that: a discrete two-bit CNOT gate needs to be made in sequence between the auxiliary qubit and each of the data qubits, so that a joint parity check time of the plurality of bits is long, and gate errors are accumulative, resulting in low algorithm fidelity. In this way, the number of parity check that can be repeated within a limited coherence time of the bits is low, and the circuit depth is low, resulting in low performance of the quantum chip.

Figure 5:
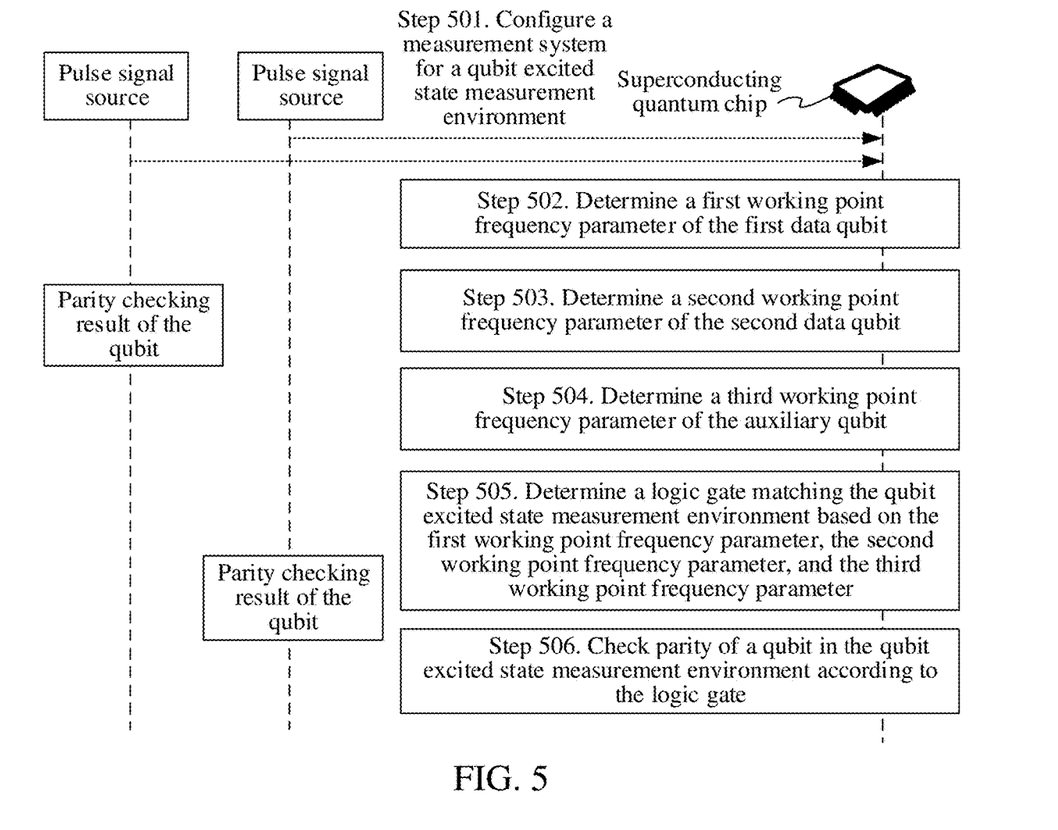
FIG. 5 is an example schematic diagram of a process of parity check of a qubit according to an embodiment of this disclosure.

To overcome the above disadvantages, FIG. 5 is a schematic diagram of a process of parity check of a qubit according to an example embodiment of this disclosure. The process includes the following steps.

Step 501. Configure a measurement system for a qubit excited state measurement environment, the measurement system including: a first data qubit, a second data qubit, and an auxiliary qubit.

Figure 6:
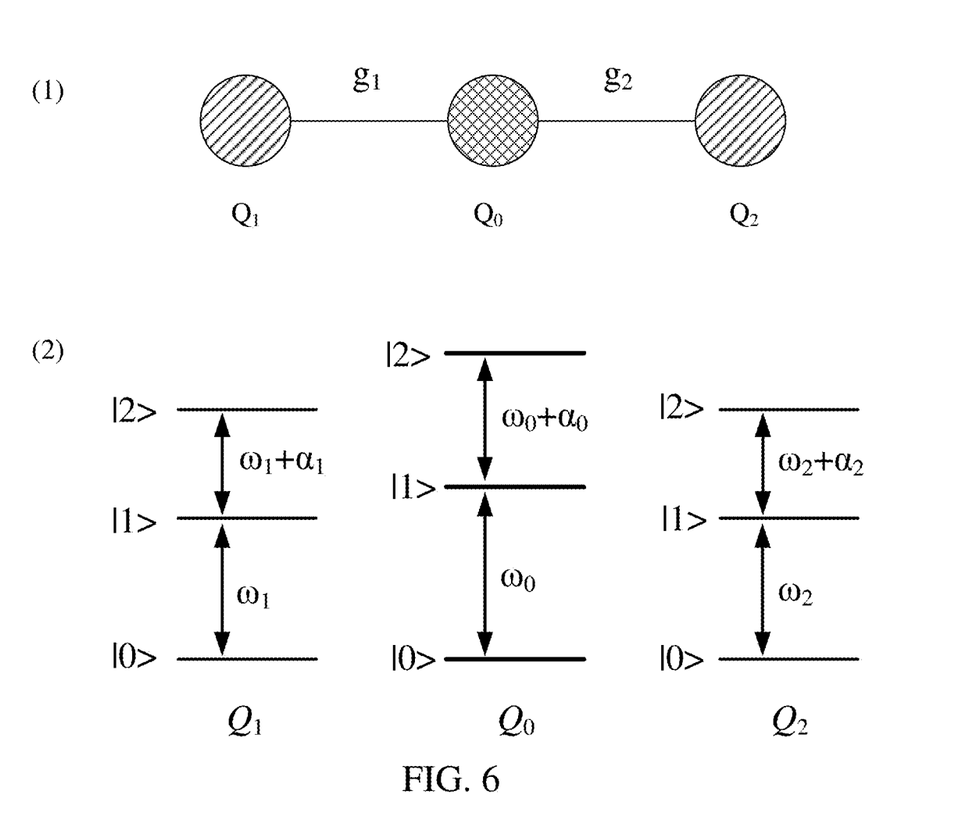
FIG. 6 is a schematic diagram of a measurement system and a corresponding bit energy level according to an example embodiment of this disclosure.

FIG. 6 is a schematic diagram of a measurement system and a corresponding bit energy level according to an embodiment of this disclosure. The configuration of a measurement system for a qubit excited state measurement environment may be implemented in the following manners:

determining first coupling strength between the first data qubit and the auxiliary qubit; determining second coupling strength between the second data qubit and the auxiliary qubit; determining third coupling strength between the first data qubit and the second data qubit; and adjusting positions of the first data qubit, the second data qubit, and the auxiliary qubit according to the first coupling strength, the second coupling strength, and the third coupling strength, to obtain the measurement system. Herein, the third coupling strength may be 0. In this case, the positions of the first data qubit, the second data qubit, and the auxiliary qubit may be adjusted according to the first coupling strength and the second coupling strength.

Step 502. Determine a first operational frequency parameter of the first data qubit.

Step 503. Determine a second operational frequency parameter of the second data qubit.

Step 504. Determine a third operational frequency parameter of the auxiliary qubit.

After the configuration of the first data qubit, the second data qubit, and the auxiliary qubit included in the measurement system is completed, the first operational frequency parameter of the first data qubit, the second operational frequency parameter of the second data qubit, and the third operational frequency parameter of the auxiliary qubit may be determined. The first operational frequency parameter may include a first eigenfrequency parameter and a first anharmonicity parameter, the second operational frequency parameter may include a second eigenfrequency parameter and a second anharmonicity parameter, and the third operational frequency parameter may include a third eigenfrequency parameter and a third anharmonicity parameter.

In this embodiment of this disclosure, a first bit energy level of the first data qubit may be determined based on the first eigenfrequency parameter and the first anharmonicity parameter; a second bit energy level of the second data qubit may be determined based on the second eigenfrequency parameter and the second anharmonicity parameter; and a third bit energy level of the auxiliary qubit may be determined based on the third eigenfrequency parameter and the third anharmonicity parameter.

For ease of description, the first data qubit may be recorded as $Q_1$, the second data qubit may be recorded as $Q_2$, and the auxiliary qubit may be recorded as $Q_0$. Coupling strength (namely, the first coupling strength) between $Q_1$ and $Q_0$ is recorded as $g_1$, coupling strength (namely, the second coupling strength) between $Q_2$ and $Q_0$ is recorded as $g_2$, and coupling strength (namely, the third coupling strength) between $Q_1$ and $Q_2$ is recorded as 0. $\omega_i$ represents an eigenfrequency parameter of $Q_i$, and $\alpha_i$ represents an anharmonicity parameter of $Q_i$, where i=0, 1, 2.

Step 505. Determine a logic gate matching the qubit excited state measurement environment based on the first operational frequency parameter, the second operational frequency parameter, and the third operational frequency parameter.

The logic gate may be a control Pauli-Z gate or an iSwap gate, to perform different parity check processes.

Step 506. Check parity of a qubit in the qubit excited state measurement environment according to the logic gate.

Figure 7:
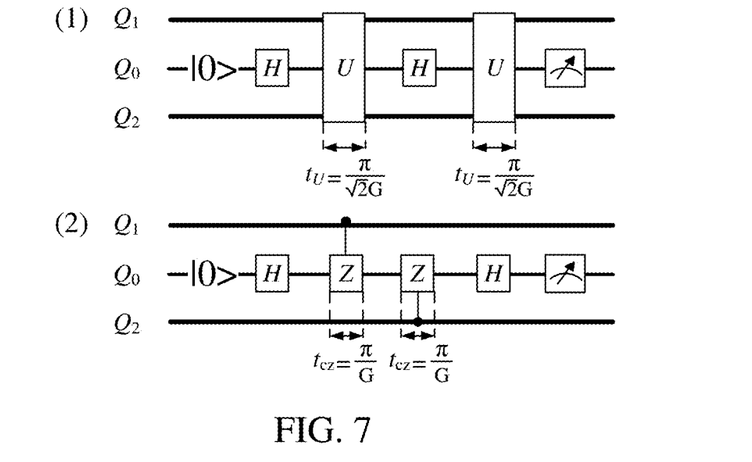
FIG. 7 is a schematic diagram of parity check of a control Pauli-Z gate according to an example embodiment of this disclosure.

In some embodiments of this disclosure, determining a logic gate matching the qubit excited state measurement environment based on the first operational frequency parameter, the second operational frequency parameter, and the third operational frequency parameter may be implemented in the following manners: determining the logic gate matching the qubit excited state measurement environment as the control Pauli-Z gate when a sum of the third eigenfrequency parameter and the third anharmonicity parameter is equal to the first eigenfrequency parameter and the first eigenfrequency parameter is equal to the second eigenfrequency parameter. Herein, the control Pauli-Z gate may include a first control Pauli-Z gate configured for the first data qubit and the auxiliary qubit and a second control Pauli-Z gate configured for the second data qubit and the auxiliary qubit. FIG. 7 is a schematic diagram of parity check of a control Pauli-Z gate according to an embodiment of this disclosure. When the operational frequency parameters of the auxiliary qubit $Q_0$ and the data qubits $Q_1$ and $Q_2$ meet a relationship of $\omega_0+\alpha_0=\omega_1=\omega_2$, a Hamiltonian parameter of the measurement system may be represented as a formula 1 in a rotating coordinate system:

$$H=\sigma_{21}^{(0)}(G_1\sigma_{01}^{(0)}+G_2\sigma_{01}^{(2)})+H\cdot C\cdot \qquad \text{Formula 1}$$

where, $\sigma_{lm}^{(n)}=|1\rangle\langle m|$ is a Pauli operator; when n=0, n represents the auxiliary qubit $Q_0$; when n=1, n represents the first data qubit $Q_1$; and when n=2, n represents the second data qubit $Q_2$, $G_1=\sqrt{2}g_1$ and $G_2=\sqrt{2}g_2$ respectively represent coupling strength between the bit energy level of the auxiliary qubit and bit energy levels of data qubits $|20\rangle$ and $|11\rangle$. $H\cdot C\cdot$ represents a conjugate.

From $\sigma_{01}^{(1)} \otimes I^{(2)} = |00\rangle\langle 10| + |01\rangle\langle 11|$ and $I^{(2)} \otimes \sigma_{01}^{(2)} = |00\rangle\langle 10| + |10\rangle\langle 11|$, when $G_1 = G_2 = G$, refer to a formula 2:

$$H = G\sigma_{21}^{(0)}(\sigma_{01}^{(1)} + \sigma_{01}^{(2)}) + H \cdot C \cdot = \sqrt{2}G|200\rangle\langle 1B| + \sqrt{2}G|2B\rangle\langle 111| + H \cdot C \cdot \quad \text{Formula 2}$$

where, a bright state $|B\rangle = (|01\rangle\langle 10|)/\sqrt{2}$, and a dark state $|D\rangle = (|01\rangle - \langle 10|)/\sqrt{2}$. In this case, the Hamiltonian parameter of the measurement system equivalently describes two discrete two-energy level systems. When $\sqrt{2}Gt = \pi$, an evolution operator of the system may be described as a formula 3:

$$U = -|200\rangle\langle 200| - |1B\rangle\langle 1B| - |2B\rangle\langle 2B| - |111\rangle\langle 111| + |2D\rangle\langle 2D| + |1D\rangle\langle 1D| + |100\rangle\langle 100| + |211\rangle\langle 211|$$
$$\langle 211| = \sigma_{Z,12}^{(0)}(|00\rangle\langle 00| - |11\rangle\langle 11|) - I_{12}^{(0)} \otimes |B\rangle\langle B| + I_{12}^{(0)} \otimes |D\rangle\langle D| \quad \text{Formula 3}$$

where, $\sigma_{Z,12}^{(0)} = |1\rangle\langle 1| - |2\rangle\langle 2|$ and $\sigma_{Z,12}^{(0)} = |1\rangle\langle 1| + |2\rangle\langle 2|$ are a Pauli operator and a unit operator of subspace of $|1\rangle$ and $|2\rangle$ of the auxiliary qubit. Actually, in this case, by using a Hadamard gate operation of the subspace:

$$H^{(0)} = \frac{1}{\sqrt{2}}[(|1\rangle + |2\rangle)\langle 1| + (|1\rangle - |2\rangle)\langle 2|],$$

a formula 4 is obtained:

$$H^{(0)}UH^{(0)} = \sigma_{Z,12}^{(0)}(|00\rangle\langle 00| - |11\rangle\langle 11|) - I_{12}^{(0)} \otimes |B\rangle\langle B| + I_{12}^{(0)} \otimes |D\rangle\langle D| \quad \text{Formula 4}$$

In this way, parity measurement may be performed. Even though the operation may change a state of an input bit, this change is determined and can be traced. Therefore, in this case, parity check may also be implemented by only needing to shorten $$t_U = \frac{\pi}{\sqrt{2}G} \text{ to } \frac{1}{2}\sqrt{2}$$

of a duration required for a conventional solution.

In some embodiments of this disclosure, when a phase of an input state remains unchanged, a second Hamiltonian parameter is converted, to obtain a third Hamiltonian parameter; a state of the auxiliary qubit is determined according to the third Hamiltonian parameter; when the state of the auxiliary qubit is that the auxiliary qubit flips, it is determined that the qubit is in an even excited state; and when the state of the auxiliary qubit is that the auxiliary qubit remains unchanged, it is determined that the qubit is in an odd excited state.

Herein, when the phase of the input state remains unchanged, a U operation may be continuously performed to obtain a formula 5:

$$H^{(0)}UH^{(0)} = -i\sigma_{y,12}^{(0)}(|00\rangle\langle 00| - |11\rangle\langle 11|) - I_{12}^{(0)} \otimes |B\rangle\langle B| + I_{12}^{(0)} \otimes |D\rangle\langle D| \quad \text{Formula 5}$$

When the input state is excited by an even number (for example, $|11\rangle + |11\rangle$), the auxiliary qubit $Q_0$ flips; and when the input state is excited by an odd number (for example, $|01\rangle + |10\rangle$), the auxiliary qubit remains unchanged, so that joint parity check of a plurality of bits can be implemented according to the state of the auxiliary qubit. FIG. 7(1) describes a parity check circuit diagram corresponding to the above process. Compared with the conventional process described in FIG. 7(2), a time $$t_U = \frac{\pi}{\sqrt{2}G}$$

required for simultaneously performing a U operation of a two-bit controlled-Z (CZ) gate between the two data qubits and the auxiliary qubit is $1/\sqrt{2}$ times of a time $$t_{cz} = \frac{\pi}{G}$$

consumed by a discrete CZ gate. As a result, a speed of the two-bit parity check solution is increased to $\sqrt{2}$ times of the existing solution (where only a duration of the two-bit gate is calculated, and an operation time of a single-bit gate is not included), and the next repeated check can also be efficiently performed, and the improvement of the speed is not affected by read pulse and fidelity.

Figure 8:
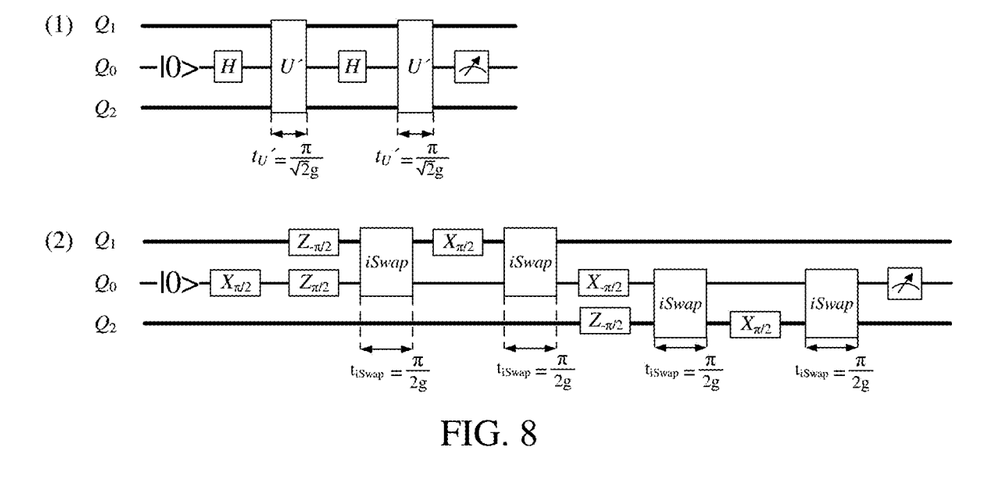
FIG. 8 is a schematic diagram of parity check of an iSwap gate according to an example embodiment of this disclosure.

In some embodiments of this disclosure, determining a logic gate matching the qubit excited state measurement environment based on the first operational frequency parameter, the second operational frequency parameter, and the third operational frequency parameter may be implemented in the following manners: determining the logic gate matching the qubit excited state measurement environment as the iSwap gate when the first eigenfrequency parameter, the second eigenfrequency parameter, and the third eigenfrequency parameter are all equal. Herein, the iSwap gate may include a first iSwap gate configured for the first data qubit and the auxiliary qubit and a second iSwap gate configured for the second data qubit and the auxiliary qubit. During check, a fourth Hamiltonian parameter of the measurement system is determined according to the first iSwap gate and the second iSwap gate; the fourth Hamiltonian parameter is adjusted based on a Hadamard gate (an effect of the Hadamard gate is to transform a basis of a state of a qubit) in the measurement system, to obtain a fifth Hamiltonian parameter; when a phase of an input state remains unchanged, the fifth Hamiltonian parameter is converted, to obtain a sixth Hamiltonian parameter; a state of the auxiliary qubit is determined according to the sixth Hamiltonian parameter; when the state of the auxiliary qubit is that the auxiliary qubit flips, it is determined that the qubit is in an even excited state; and when the state of the auxiliary qubit is that the auxiliary qubit remains unchanged, it is determined that the qubit is in an odd excited state. FIG. 8 is a schematic diagram of parity check of an iSwap gate according to an embodiment of this disclosure. When the operational frequency parameters of the auxiliary qubit $Q_0$ and the data qubits $Q_1$ and $Q_2$ meet a relationship of $\omega_0 = \omega_1 = \omega_2$, the fourth Hamiltonian parameter of the measurement system may be represented as a formula 6 in the rotating coordinate system:)

$$H' = \sigma_{10}^{(0)}(g_1\sigma_{01}^{(0)} + g_2\sigma_{01}^{(2)}) + H \cdot C \cdot \quad \text{Formula 6}$$

When $g_1 = g_2 = g$, refer to a formula 7:

$$H' = g\sigma_{21}^{(0)}(\sigma_{01}^{(1)} + \sigma_{01}^{(2)}) + H \cdot C \cdot = \sqrt{2}g|100\rangle\langle 0B| + \sqrt{2}g|1B\rangle\langle 011| + H \cdot C - \quad \text{Formula 7}$$

where, a bright state $|B\rangle = (|01\rangle\langle 10|)/\sqrt{2}$, and a dark state $|D\rangle = (|01\rangle - \langle 10|)/\sqrt{2}$. Similarly, in this case, the fourth Hamiltonian parameter of the measurement system equivalently describes two discrete two-energy level systems. When $\sqrt{2}gt=\pi$, an evolution operator of the measurement system may be described as a formula 8:

$$U'=-|100\rangle\langle100|-|0B\rangle\langle0B|-|1B\rangle\langle1B|-|011\rangle\langle011|+$$
$$|0D\rangle\langle0D|+|1D\rangle\langle1D|+|000\rangle\langle000|+|111\rangle$$
$$\langle111|=\sigma_{Z,12}{}^{(0)}(|00\rangle\langle00|-|11\rangle\langle11|)-I_{01}{}^{(0)}\otimes|B\rangle$$
$$\langle B|+I_{01}{}^{(0)}\otimes|D\rangle\langle D| \qquad \text{Formula 8}$$

where, $\sigma_{Z,01}{}^{(0)}=|0\rangle\langle0|-|1\rangle\langle1|$ and $\sigma_{01}{}^{(0)}=|0\rangle\langle+|+|1\rangle\langle1|$ are a Pauli operator and a unit operator of subspace of $|0\rangle$ and $|1\rangle$ of the auxiliary qubit. Therefore, the fourth Hamiltonian parameter is adjusted based on the Hadamard gate in the measurement system, to obtain the fifth Hamiltonian parameter, referring to a formula 9:

$$H'^{(0)}UH'^{(0)}=\sigma_{x,01}{}^{(0)}(|00\rangle\langle00|-|11\rangle\langle11|)-I_{01}{}^{(0)}\otimes|B\rangle$$
$$\langle B|+I_{01}{}^{(0)}\otimes|D\rangle\langle D| \qquad \text{Formula 9}$$

where, $$H'^{(0)} = \frac{1}{\sqrt{2}}[(|0\rangle+|1\rangle)\langle0|+(|0\rangle-|1\rangle)\langle1|],$$

To ensure that the phase of the input state remains unchanged, a U operation may be performed to obtain the sixth Hamiltonian parameter, referring to a formula 10:

$$H'^{(0)}UH'^{(0)}U'=-i\sigma_{y,01}{}^{(0)}|00\rangle\langle00|-|11\rangle\langle11|)-$$
$$I_{01}{}^{(0)}\otimes|B\rangle\langle B|+I_{01}{}^{(0)}\otimes|D\rangle\langle D| \qquad \text{Formula 10}$$

Similar to the situation of simultaneously configuring the CZ gate, joint parity check of a plurality of bits can be implemented according to the state of the auxiliary qubit. FIG. 8(1) describes a parity check circuit diagram corresponding to the above process of parallel iSwap gates. Compared with a process of performing parity check by using a discrete iSwap gate described in FIG. 8(2), a time $$t_{U'} = \frac{\pi}{\sqrt{2}G}$$

required for simultaneously performing a U' operation of a two-bit iSwap gate between the two data qubits and the auxiliary qubit is $1/\sqrt{2}$ times of a time $$t_{iswap} = \frac{\pi}{2g}$$

consumed by a discrete iSwap gate. As a result, the solution can be used for increasing the depth of a quantum circuit, thereby increasing the complexity of an algorithm that can be compiled on a quantum chip (a superconducting quantum chip), and increasing the number of parity check that can be implemented within a limited coherence time of qubits, thereby improving the performance of a quantum processor.

The following continuously describes an exemplary structure that the parity checking apparatus for a qubit provided in the embodiments of this disclosure is implemented as software modules. In some embodiments, as shown in FIG. 2, the software modules of the parity checking apparatus for a qubit stored in the memory 202 may include: the signal transmission module 2021, configured to configure a measurement system for a qubit excited state measurement environment, the measurement system including: a first data qubit, a second data qubit, and an auxiliary qubit; the signal processing module 2022, configured to: determine a first operational frequency parameter of the first data qubit; determine a second operational frequency parameter of the second data qubit; determine a third operational frequency parameter of the auxiliary qubit; determine a logic gate matching the qubit excited state measurement environment based on the first operational frequency parameter, the second operational frequency parameter, and the third operational frequency parameter; and check parity of a qubit in the qubit excited state measurement environment according to the logic gate.

In some embodiments, the signal transmission module 2021 is further configured to: determine first coupling strength between the first data qubit and the auxiliary qubit; determine second coupling strength between the second data qubit and the auxiliary qubit; determine third coupling strength between the first data qubit and the second data qubit; and adjust positions of the first data qubit, the second data qubit, and the auxiliary qubit according to the first coupling strength, the second coupling strength, and the third coupling strength, to obtain the measurement system.

In some embodiments, the third coupling strength is 0; and the signal transmission module 2021 is further configured to: adjust the positions of the first data qubit, the second data qubit, and the auxiliary qubit according to the first coupling strength and the second coupling strength.

In some embodiments, the first operational frequency parameter includes a first eigenfrequency parameter and a first anharmonicity parameter of the first data qubit, the second operational frequency parameter includes a second eigenfrequency parameter and a second anharmonicity parameter of the second data qubit, and the third operational frequency parameter includes a third eigenfrequency parameter and a third anharmonicity parameter of the auxiliary qubit; and the signal processing module 2022 is further configured to: determine a first bit energy level of the first data qubit based on the first eigenfrequency parameter and the first anharmonicity parameter; determine a second bit energy level of the second data qubit based on the second eigenfrequency parameter and the second anharmonicity parameter; and determine a third bit energy level of the auxiliary qubit based on the third eigenfrequency parameter and the third anharmonicity parameter.

In some embodiments, the first operational frequency parameter includes the first eigenfrequency parameter and the first anharmonicity parameter of the first data qubit, the second operational frequency parameter includes the second eigenfrequency parameter and the second anharmonicity parameter of the second data qubit, and the third operational frequency parameter includes the third eigenfrequency parameter and the third anharmonicity parameter of the auxiliary qubit; and the signal processing module 2022 is further configured to: determine the logic gate matching the qubit excited state measurement environment as a control Pauli-Z gate whenwhen a sum of the third eigenfrequency parameter and the third anharmonicity parameter is equal to the first eigenfrequency parameter and the first eigenfrequency parameter is equal to the second eigenfrequency parameter.

In some embodiments, the control Pauli-Z gate includes a first control Pauli-Z gate configured for the first data qubit and the auxiliary qubit and a second control Pauli-Z gate configured for the second data qubit and the auxiliary qubit; and the signal processing module 2022 is further configured to: determine a first Hamiltonian parameter of the measurement system according to the first control Pauli-Z gate and the second control Pauli-Z gate; adjust the first Hamiltonian parameter based on a Hadamard gate in the measurement system, to obtain a second Hamiltonian parameter; and determine a parity checking result of the qubit in the qubit excited state measurement environment according to the second Hamiltonian parameter.

In some embodiments, the signal processing module 2022 is further configured to: perform a parity measurement on the second Hamiltonian parameter, to obtain the parity checking result of the qubit in the qubit excited state measurement environment.

In some embodiments, the signal processing module 2022 is further configured to: convert the second Hamiltonian parameter when a phase of an input state remains unchanged, to obtain a third Hamiltonian parameter; determine a state of the auxiliary qubit according to the third Hamiltonian parameter; determine, when the state of the auxiliary qubit is that the auxiliary qubit flips, that the qubit is in an even excited state; and determine, when the state of the auxiliary qubit is that the auxiliary qubit remains unchanged, that the qubit is in an odd excited state.

In some embodiments, the first operational frequency parameter includes the first eigenfrequency parameter of the first data qubit, the second operational frequency parameter includes the second eigenfrequency parameter of the second data qubit, and the third operational frequency parameter includes the third eigenfrequency parameter of the auxiliary qubit; and the signal processing module 2022 is further configured to: determine the logic gate matching the qubit excited state measurement environment as an iSwap gate when the first eigenfrequency parameter, the second eigenfrequency parameter, and the third eigenfrequency parameter are all equal.

In some embodiments, the iSwap gate includes a first iSwap gate configured for the first data qubit and the auxiliary qubit and a second iSwap gate configured for the second data qubit and the auxiliary qubit; and the signal processing module 2022 is further configured to: determine a fourth Hamiltonian parameter of the measurement system according to the first iSwap gate and the second iSwap gate; adjust the fourth Hamiltonian parameter based on a Hadamard gate in the measurement system, to obtain a fifth Hamiltonian parameter; convert the fifth Hamiltonian parameter when a phase of an input state remains unchanged, to obtain a sixth Hamiltonian parameter; determine a state of the auxiliary qubit according to the sixth Hamiltonian parameter; determine, when the state of the auxiliary qubit is that the auxiliary qubit flips, that the qubit is in an even excited state; and determine, when the state of the auxiliary qubit is that the auxiliary qubit remains unchanged, that the qubit is in an odd excited state.

In the disclosure above, a unit or a module may be hardware such as a combination of electronic circuitries, firmware, or software such as computer instructions. The unit and the module may also be any combination of hardware, firmware, and software. In some implementation, a unit may include at least one module.

An embodiment of this disclosure provides a computer program product or a computer program, including computer instructions (namely, executable instructions), the computer instructions being stored in a computer-readable storage medium. A processor of an electronic device reads the computer instructions from the computer-readable storage medium, and the processor executes the computer instructions, to cause the electronic device to perform the above parity checking method for a qubit provided in the embodiments of this disclosure.

An embodiment of this disclosure provides a computer-readable storage medium, storing executable instructions, the executable instructions, when executed by a processor, causing the processor to perform the parity checking method for a qubit provided in the embodiments of this disclosure.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

As an example, the executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

Beneficial technical effects:

In this disclosure, a parity checking method for a qubit configures a measurement system for a qubit excited state measurement environment, the measurement system including: a first data qubit, a second data qubit, and an auxiliary qubit; determines a first operational frequency parameter of the first data qubit; determines a second operational frequency parameter of the second data qubit; determines a third operational frequency parameter of the auxiliary qubit; determines a logic gate matching the qubit excited state measurement environment based on the first operational frequency parameter, the second operational frequency parameter, and the third operational frequency parameter; and checks parity of a qubit in the qubit excited state measurement environment according to the logic gate. Therefore, in the parity checking method for a qubit provided in this disclosure, the accurate detection of parity of an excited state of a superconducting qubit can be realized, thereby effectively improving the detection speed; and a superconducting quantum chip also does not need to add additional components, and is fully compatible with an architecture of a current quantum processor, thereby reducing the hardware cost, and improving the performance of the quantum processor, thereby being conducive to large-scale promotion of the superconducting quantum chip.

The foregoing descriptions are merely preferred embodiments of this disclosure, but are not intended to limit this disclosure. Any modification, equivalent replacement and improvement made within the spirit and principle of this disclosure shall fall within the protection scope of this disclosure.

What is claimed is:

1. A parity checking method for a qubit, performed by an electronic device, the method comprising:
configuring a measurement system for a qubit excited state measurement environment, the measurement system comprising: a first data qubit, a second data qubit, and an auxiliary qubit;
determining a first operational frequency parameter of the first data qubit;
determining a second operational frequency parameter of the second data qubit;
determining a third operational frequency parameter of the auxiliary qubit;
determining a logic gate matching the qubit excited state measurement environment based on the first operational frequency parameter, the second operational frequency parameter, and the third operational frequency parameter; and
checking parity of a qubit in the qubit excited state measurement environment according to the logic gate; the logic gate including components that simultaneously operates between the first data qubit and the auxiliary qubit, and between the second data qubit and the auxiliary qubit.

2. The method according to claim 1, wherein configuring a measurement system for a qubit excited state measurement environment comprises:
determining first coupling strength between the first data qubit and the auxiliary qubit;
determining second coupling strength between the second data qubit and the auxiliary qubit;
determining third coupling strength between the first data qubit and the second data qubit; and
adjusting positions of the first data qubit, the second data qubit, and the auxiliary qubit according to the first coupling strength, the second coupling strength, and the third coupling strength, to configure the measurement system.

3. The method according to claim 2, wherein the third coupling strength is 0; and
adjusting positions of the first data qubit, the second data qubit, and the auxiliary qubit according to the first coupling strength, the second coupling strength, and the third coupling strength comprises:
adjusting the positions of the first data qubit, the second data qubit, and the auxiliary qubit according to the first coupling strength and the second coupling strength.

4. The method according to claim 1, wherein the first operational frequency parameter comprises a first eigenfrequency parameter and a first anharmonicity parameter of the first data qubit, the second operational frequency parameter comprises a second eigenfrequency parameter and a second anharmonicity parameter of the second data qubit, and the third operational frequency parameter comprises a third eigenfrequency parameter and a third anharmonicity parameter of the auxiliary qubit; and
the method further comprises:
determining a first bit energy level of the first data qubit based on the first eigenfrequency parameter and the first anharmonicity parameter;
determining a second bit energy level of the second data qubit based on the second eigenfrequency parameter and the second anharmonicity parameter; and
determining a third bit energy level of the auxiliary qubit based on the third eigenfrequency parameter and the third anharmonicity parameter.

5. The method according to claim 1, wherein the first operational frequency parameter comprises a first eigenfrequency parameter and a first anharmonicity parameter of the first data qubit, the second operational frequency parameter comprises a second eigenfrequency parameter and a second anharmonicity parameter of the second data qubit, and the third operational frequency parameter comprises a third eigenfrequency parameter and a third anharmonicity parameter of the auxiliary qubit; and
determining the logic gate matching the qubit excited state measurement environment based on the first operational frequency parameter, the second operational frequency parameter, and the third operational frequency parameter comprises:
determining the logic gate matching the qubit excited state measurement environment as a control Pauli-Z gate when a sum of the third eigenfrequency parameter and the third anharmonicity parameter is equal to the first eigenfrequency parameter and the first eigenfrequency parameter is equal to the second eigenfrequency parameter.

6. The method according to claim 5, wherein the control Pauli-Z gate comprises a first control Pauli-Z gate configured for the first data qubit and the auxiliary qubit and a second control Pauli-Z gate configured for the second data qubit and the auxiliary qubit; and
checking parity of the qubit in the qubit excited state measurement environment according to the logic gate comprises:
determining a first Hamiltonian parameter of the measurement system according to the first control Pauli-Z gate and the second control Pauli-Z gate;
adjusting the first Hamiltonian parameter based on a Hadamard gate in the measurement system, to obtain a second Hamiltonian parameter; and
determining a parity checking result of the qubit in the qubit excited state measurement environment according to the second Hamiltonian parameter.

7. The method according to claim 6, wherein determining the parity checking result of the qubit in the qubit excited state measurement environment according to the second Hamiltonian parameter comprises:
performing a parity measurement on the second Hamiltonian parameter, to obtain the parity checking result of the qubit in the qubit excited state measurement environment.

8. The method according to claim 6, wherein determining the parity checking result of the qubit in the qubit excited state measurement environment according to the second Hamiltonian parameter comprises:
converting the second Hamiltonian parameter when a phase of an input state remains unchanged, to obtain a third Hamiltonian parameter;
determining a state of the auxiliary qubit according to the third Hamiltonian parameter;
determining, when the state of the auxiliary qubit is that the auxiliary qubit flips, that the qubit is in an even excited state; and
determining, when the state of the auxiliary qubit is that the auxiliary qubit remains unchanged, that the qubit is in an odd excited state.

9. The method according to claim 1, wherein the first operational frequency parameter comprises a first eigenfrequency parameter of the first data qubit, the second operational frequency parameter comprises a second eigenfrequency parameter of the second data qubit, and the third operational frequency parameter comprises a third eigenfrequency parameter of the auxiliary qubit; and
determining the logic gate matching the qubit excited state measurement environment based on the first operational frequency parameter, the second operational frequency parameter, and the third operational frequency parameter comprises:
determining the logic gate matching the qubit excited state measurement environment as an iSwap gate when the first eigenfrequency parameter, the second eigenfrequency parameter, and the third eigenfrequency parameter are all equal.

10. The method according to claim 9, wherein the iSwap gate comprises a first iSwap gate configured for the first data qubit and the auxiliary qubit and a second iSwap gate configured for the second data qubit and the auxiliary qubit; and
checking parity of the qubit in the qubit excited state measurement environment according to the logic gate comprises:
determining a fourth Hamiltonian parameter of the measurement system according to the first iSwap gate and the second iSwap gate;
adjusting the fourth Hamiltonian parameter based on a Hadamard gate in the measurement system, to obtain a fifth Hamiltonian parameter;
converting the fifth Hamiltonian parameter when a phase of an input state remains unchanged, to obtain a sixth Hamiltonian parameter;
determining a state of the auxiliary qubit according to the sixth Hamiltonian parameter;
determining, when the state of the auxiliary qubit is that the auxiliary qubit flips, that the qubit is in an even excited state; and
determining, when the state of the auxiliary qubit is that the auxiliary qubit remains unchanged, that the qubit is in an odd excited state.

11. A parity checking apparatus for a qubit, comprising a memory for storing instructions and a circuitry for executing the instructions to:
configure a measurement system for a qubit excited state measurement environment, the measurement system comprising: a first data qubit, a second data qubit, and an auxiliary qubit;
determine a first operational frequency parameter of the first data qubit;
determine a second operational frequency parameter of the second data qubit;
determine a third operational frequency parameter of the auxiliary qubit;
determine a logic gate matching the qubit excited state measurement environment based on the first operational frequency parameter, the second operational frequency parameter, and the third operational frequency parameter; and
check parity of a qubit in the qubit excited state measurement environment according to the logic gate; the logic gate including components that simultaneously operates between the first data qubit and the auxiliary qubit, and between the second data qubit and the auxiliary qubit.

12. The parity checking apparatus according to claim 11, wherein the circuitry is further configured to executed the instructions to:
determine first coupling strength between the first data qubit and the auxiliary qubit;
determine second coupling strength between the second data qubit and the auxiliary qubit;
determine third coupling strength between the first data qubit and the second data qubit; and
adjust positions of the first data qubit, the second data qubit, and the auxiliary qubit according to the first coupling strength, the second coupling strength, and the third coupling strength, to configure the measurement system.

13. The parity checking apparatus according to claim 12, wherein the third coupling strength is 0; and
the circuitry is further configured to execute the instructions to:
adjust the positions of the first data qubit, the second data qubit, and the auxiliary qubit according to the first coupling strength and the second coupling strength.

14. The parity checking apparatus according to claim 11, wherein the first operational frequency parameter comprises a first eigenfrequency parameter and a first anharmonicity parameter of the first data qubit, the second operational frequency parameter comprises a second eigenfrequency parameter and a second anharmonicity parameter of the second data qubit, and the third operational frequency parameter comprises a third eigenfrequency parameter and a third anharmonicity parameter of the auxiliary qubit; and
the circuitry is further configured to execute the instructions to:
determine a first bit energy level of the first data qubit based on the first eigenfrequency parameter and the first anharmonicity parameter;
determine a second bit energy level of the second data qubit based on the second eigenfrequency parameter and the second anharmonicity parameter; and
determine a third bit energy level of the auxiliary qubit based on the third eigenfrequency parameter and the third anharmonicity parameter.

15. The parity checking apparatus according to claim 14, wherein the circuitry is further configured to execute the instructions to determine the logic gate matching the qubit excited state measurement environment as a control Pauli-Z gate when a sum of the third eigenfrequency parameter and the third anharmonicity parameter is equal to the first eigenfrequency parameter and the first eigenfrequency parameter is equal to the second eigenfrequency parameter.

16. The parity checking apparatus according to claim 15, wherein the control Pauli-Z gate comprises a first control Pauli-Z gate configured for the first data qubit and the auxiliary qubit and a second control Pauli-Z gate configured for the second data qubit and the auxiliary qubit; and
the circuitry is further configured to execute the instructions to:
determine a first Hamiltonian parameter of the measurement system according to the first control Pauli-Z gate and the second control Pauli-Z gate;
adjust the first Hamiltonian parameter based on a Hadamard gate in the measurement system, to obtain a second Hamiltonian parameter; and
determine a parity checking result of the qubit in the qubit excited state measurement environment according to the second Hamiltonian parameter.

17. The parity checking apparatus according to claim 16, wherein to determining the parity checking result of the qubit in the qubit excited state measurement environment according to the second Hamiltonian parameter comprises:
to perform a parity measurement on the second Hamiltonian parameter, to obtain the parity checking result of the qubit in the qubit excited state measurement environment.

18. The parity checking apparatus according to claim 16, wherein to determining the parity checking result of the qubit in the qubit excited state measurement environment according to the second Hamiltonian parameter comprises:
- converting the second Hamiltonian parameter when a phase of an input state remains unchanged, to obtain a third Hamiltonian parameter;
- determining a state of the auxiliary qubit according to the third Hamiltonian parameter;
- determining, when the state of the auxiliary qubit is that the auxiliary qubit flips, that the qubit is in an even excited state; and
- determining, when the state of the auxiliary qubit is that the auxiliary qubit remains unchanged, that the qubit is in an odd excited state.

19. The parity checking apparatus according to claim 11, wherein the first operational frequency parameter comprises a first eigenfrequency parameter of the first data qubit, the second operational frequency parameter comprises a second eigenfrequency parameter of the second data qubit, and the third operational frequency parameter comprises a third eigenfrequency parameter of the auxiliary qubit; and wherein to determine a logic gate matching the qubit excited state measurement environment based on the first operational frequency parameter, the second operational frequency parameter, and the third operational frequency parameter comprises to determine the logic gate matching the qubit excited state measurement environment as an iSwap gate when the first eigenfrequency parameter, the second eigenfrequency parameter, and the third eigenfrequency parameter are all equal.

20. A non-transitory computer-readable medium for storing instructions, wherein the instructions, when executed by a processor, causes the processor to:
- configure a measurement system for a qubit excited state measurement environment, the measurement system comprising: a first data qubit, a second data qubit, and an auxiliary qubit;
- determine a first operational frequency parameter of the first data qubit;
- determine a second operational frequency parameter of the second data qubit;
- determine a third operational frequency parameter of the auxiliary qubit;
- determine a logic gate matching the qubit excited state measurement environment based on the first operational frequency parameter, the second operational frequency parameter, and the third operational frequency parameter; and
- check parity of a qubit in the qubit excited state measurement environment according to the logic gate; the logic gate including components that simultaneously operates between the first data qubit and the auxiliary qubit, and between the second data qubit and the auxiliary qubit.

* * * * *